June 5, 1934.                 K. L. HERRMANN                  1,961,858
                                   BRAKE
                             Filed May 28, 1928            2 Sheets-Sheet 1
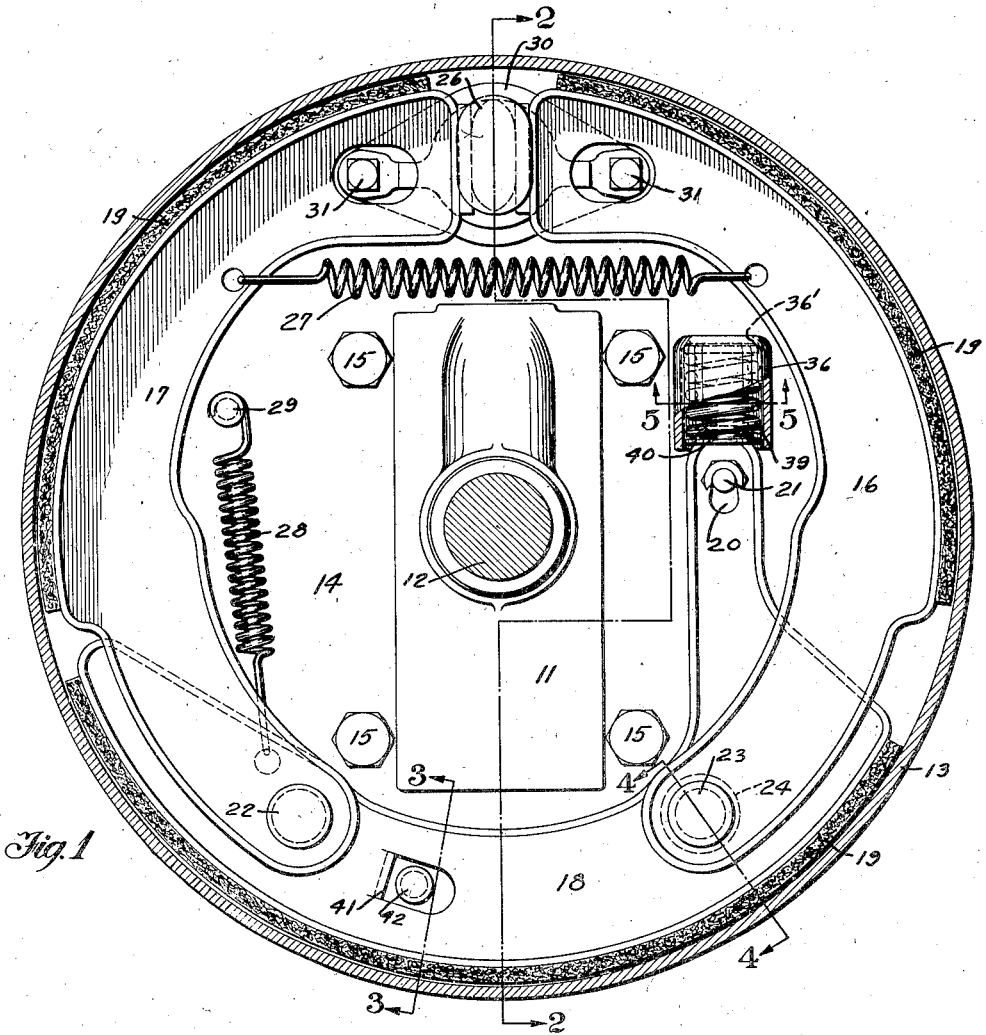
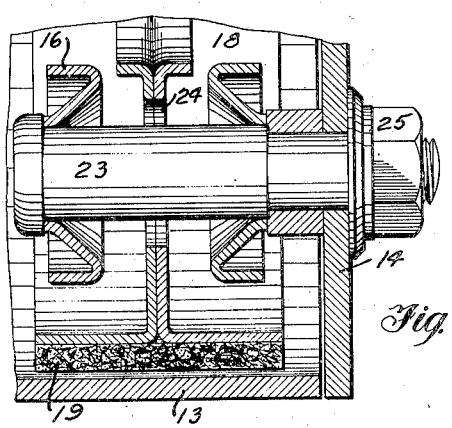
Fig. 1
Fig. 4
INVENTOR.
Karl L. Herrmann
BY
ATTORNEY June 5, 1934.　　K. L. HERRMANN　　1,961,858
BRAKE
Filed May 28, 1928　　2 Sheets-Sheet 2
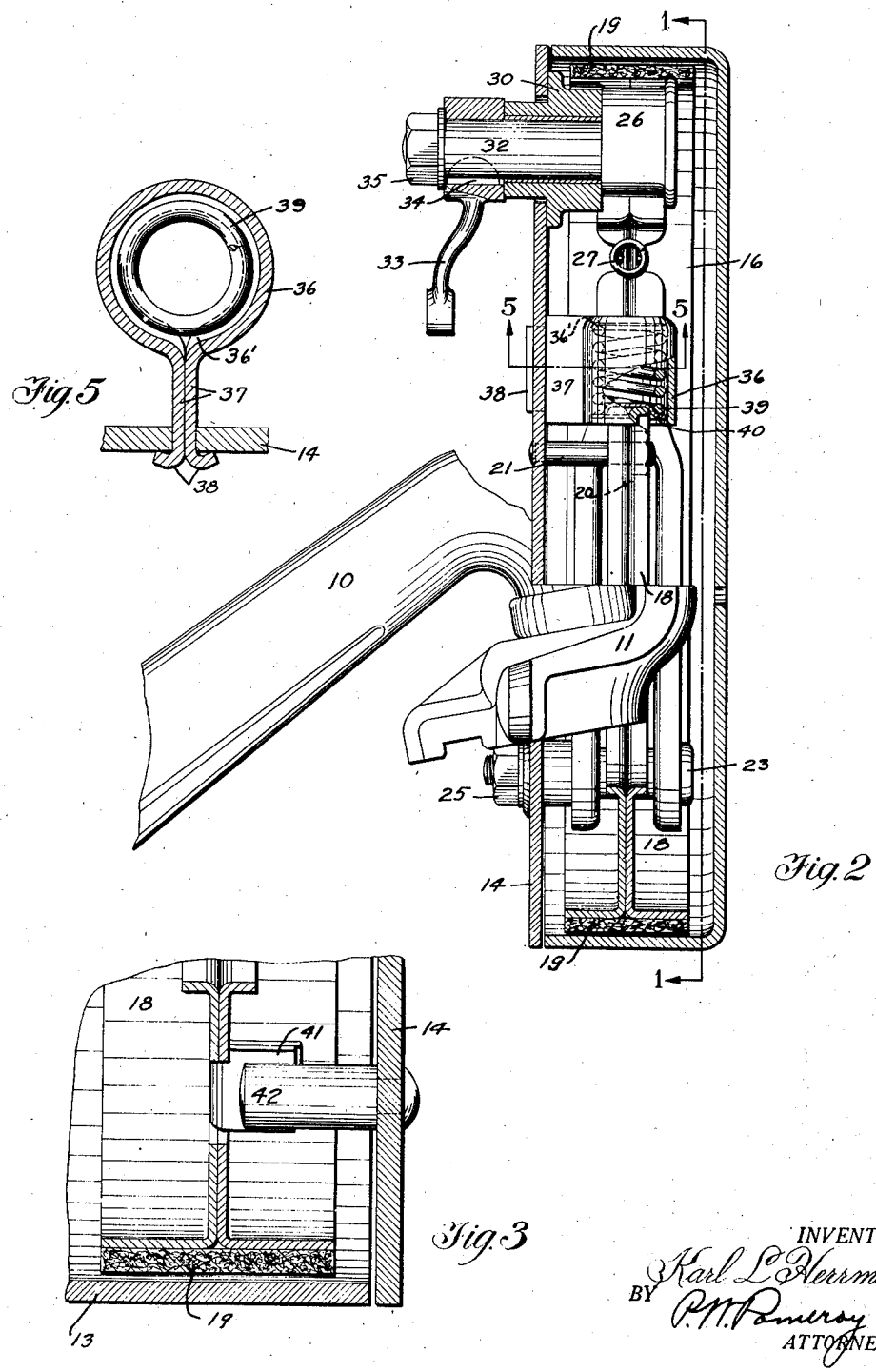
INVENTOR.
Karl L. Herrmann
BY
ATTORNEY Patented June 5, 1934

1,961,858

UNITED STATES PATENT OFFICE 1,961,858

BRAKE

Karl L. Herrmann, South Bend, Ind., assignor, by mesne assignments, to Bendix Aviation Corporation, South Bend, Ind., a corporation of Delaware Application May 28, 1928, Serial No. 281,115

8 Claims. (Cl. 188—78)

This invention relates to vehicle brakes and particularly to brakes of the internal self-energizing type, the principal object being to provide a vehicle brake with a braking element having means to prevent the same from locking with the brake drum while the brakes are being applied.

Another object is to provide a vehicle with a braking element adapted to partially engage the brake drum when the braking pressure reaches a predetermined amount.

Another object is to provide a vehicle brake having a self-energizing brake element with spring-controlled means for regulating the amount of braking pressure to thereby prevent locking of the brake mechanism during the normal operation of applying the brakes.

A further object is to provide a vehicle brake having a self-energizing brake element with a spring-controlled anchor whereby when the braking pressure reaches a predetermined amount the brake element moves relative to the anchor to prevent the braking pressure from becoming greater than said predetermined amount.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a section through the left front wheel brake of a motor vehicle taken just inside the head of the brake drum as indicated by the line 1—1 of Figure 2, showing the brake element in elevation.

Figure 2 is a transverse section taken on the line 2—2 of Figure 1 in the direction indicated by the arrows.

Figure 3 is an enlarged section taken on the line 3—3 of Figure 1 showing the stop member.

Figure 4 is an enlarged section taken on the line 4—4 of Figure 1 showing the method of anchoring the reverse shoe.

Figure 5 is an enlarged section taken on the line 5—5 of Figure 1 showing the spring device for controlling the braking pressure.

Referring to the accompanying drawings in which like numerals refer to like parts throughout the several views, the brake chosen for illustration is embodied in the left front wheel of a motor vehicle. Each end of the vehicle front axle 10 is upset to a T-shape and is provided with a steering knuckle 11 pivoted thereto in a conventional manner. This steering knuckle 11 is formed with an outwardly-extending stub axle 12 upon which the vehicle wheel (not shown) is rotatably mounted. A brake drum 13 is suitably secured to the wheel in concentric relationship with the axle 12, as shown in Figure 1, and adjacent to the open end of the same is a dust cover or backing plate 14 which is secured to the steering knuckle 11 by suitable bolts 15. The backing plate 14 excludes dirt and foreign particles from the brake mechanism and in addition, serves as a support for the brake element and operating mechanism therefor.

The brake element as previously mentioned is of the self-energizing type, that is, the type in which a portion of the same is first engaged with the brake drum and then rotated therewith a substantial amount to completely engage the brake drum. This particular brake element is preferably of the three-shoe type comprising reverse, primary and secondary shoes 16, 17 and 18 respectively, the arcuate surface of each being covered with a facing 19 of suitable friction material.

One end of the secondary shoe 18 is formed with an elongated opening 20 through which the anchor pin 21 extends, the pin being secured in any desirable manner to the backing plate 14. One end of the primary shoe 17 is bifurcated to receive the free end of the secondary shoe 18 and an articulating pin 22 pivotally hinges these shoes together. One end of the reverse shoe 16 is bifurcated to straddle the adjacent end of the secondary shoe 18, and a pin 23 extending through an enlarged opening 24 in the web of the secondary shoe 18 which is secured to the backing plate 14 by a nut 25 threaded thereon, pivotally anchors the reverse shoe 16. The opening 24 in the web of the secondary shoe 18 is somewhat larger in diameter than the anchor pin 23 for the reverse shoe 16 so that the secondary shoe 18 will be free to pivot about its anchor pin 20.

The free ends of the reverse and primary shoes 16 and 17 engage opposite sides of a rotatable operating cam 26 and are held in contact therewith by means of a coil spring 27, the ends of which are hooked through the webs of the shoes 16 and 17 adjacent to the free ends thereof. The spring 27 also normally holds the shoes 16 and 17 out of engagement with the brake drum 13. A coil spring 28 hooked through the web of the secondary shoe 18 adjacent to the free end thereof and over a pin 29 attached to the backing plate 14, likewise normally holds the secondary shoe 18 out of engagement with the brake drum 13, The rotatable cam 26 is formed with a shaft 32 which is journaled in a bracket 30 suitably secured to the backing plate 14 by bolts 31. The shaft 32 extends through the bracket 30 and backing plate 14 and is provided with a lever 33 at its outer end, which is held thereon by means of a key 34 and a nut 35. The lever 33 may be connected with any suitable operating means (not shown) for rotating the cam 26 to expand the shoes into engagement with the drum 13.

A cup 36 preferably formed from a single piece of metal to the shape shown in Figures 2 and 5 is secured to the backing plate 14 adjacent to the anchored end of the secondary shoe 18. This cup 36 is preferably formed by rolling a flat strip of metal into a cylindrical shape and bending the free ends 37 into parallel abutting relationship. These ends 37 are welded or otherwise secured together and are notched at their corners to provide projecting tongues 38 which extend through a rectangular opening in the backing plate 14 and are clinched in opposite directions against the backing plate 14 to securely hold the cup 36 in position. The upper marginal edge of the metal forming the cylindrical portion of the cup 36 is rolled radially inwardly around the circumference of the same to provide a seat 36' against which one end of a coil spring 39 positioned in the cup 36 abuts. A washer 40 having a depression therein is seated against the other end of the spring 39 and the bottom of the depression thereof engages the extreme portion of the pivoted end of the secondary shoe 18. The spring 39 is constantly in compression and normally holds the upper surface of the enlarged opening 20 in engagement with the pivot pin 21.

A portion of the metal comprising the web of the secondary shoe 18 is punched out and bent perpendicular to the plane of the web to provide a stop portion 41, and a stop pin 42 is extended through the opening left thereby and suitably secured to the backing plate 14.

When the brakes are applied by rotating the cam 26 the same pivots the reverse and primary shoes 16 and 17 about the anchor pivot pins 23 and 22 respectively into engagement with the brake drum 13. The primary shoe 17 as soon as it engages the drum 13, tends to rotate therewith and applies a force against the primary shoe articulating pin 22, which force causes the secondary shoe 18 to pivot about its anchor pin 21 into engagement with the drum 13. The braking pressure between the primary and secondary shoes 17 and 18 and the drum 13 are cumulative because of the servo action and in conventional constructions, these pressures build up to such a point that the brake shoes 17 and 18 suddenly lock the drum 13 against any rotation whatsoever. This is not the condition which is desired for a perfect brake mechanism during the normal operation thereof as it is readily understood that the ideal mechanism is one in which the speed of rotation of the brake drum is gradually decreased by the frictional engagement of the brake element and not one in which it is suddenly locked against rotation. Also, in the conventional constructions, the several brake shoes move directly on their pivots and when there is a slight misadjustment, or if the brake lining is uneven as to coefficient of friction, or if the coefficient of friction of the brake lining is greater than it should be, there is a tendency for the brake lining to dig in the brake drum causing locking of the same.

The present invention overcomes this serious disadvantage of the conventional servo brake because as soon as the braking pressure reaches a certain predetermined amount, which is equal to the force required to compress the spring 39, the secondary shoe 18 bodily moves with the drum 13 due to the compression of the spring 39. This movement of the secondary shoe 18 is permitted by the opening 20 which is larger than the pivot pin 21. The predetermined pressure is that pressure between the shoes and drum which is reached just before the pressure to cause locking of the same. It is preferable that the force to compress the spring 39 be equal to the predetermined pressure so that the secondary shoe will move just before the pressure to lock the brake drum is reached. However, if the brakes are applied with great force, as in an emergency stop, the brake shoes will operate as in the conventional construction in that it will be possible to lock the brake shoes with the brake drum when they are completely applied, but not before. To take care of extreme emergencies, the stop members 42 and surface 41 are provided to limit the amount of movement of the secondary shoe 18 beyond that necessary for the functioning of the spring 39. The spring 39 returns the secondary shoe 18 to normal inoperative position at the instant of release of the braking pressure.

It is evident from the drawings and description that the present invention will very satisfactorily prevent the brake element from suddenly and positively locking the brake drum. It is to be understood however, that formal changes may be made in the specific embodiment of the invention described without departing from the spirit and substance of the broad invention, the scope of which is commensurate with the appended claims.

What I claim is:

1. In a vehicle brake, a rotatable drum, a backing plate adjacent to the open side thereof, a servo brake element comprising a plurality of connected parts engageable therewith, an anchor for an intermediate part of said brake element mounted on said backing plate, means for moving said element into frictional engagement with said drum, a spring having engagement with said intermediate part of said element adjacent to said anchor, and a housing for said spring supported by said backing plate to hold said spring in compression, whereby said spring permits movement of said part relative to said anchor for limiting the amount of frictional pressure between said element and drum during the normal operation of applying said brake.

2. In a brake mechanism, a rotatable drum, a brake shoe engageable therewith having an enlarged opening in one end thereof, an anchor pin extending through said opening, means for moving said shoe into frictional engagement with said drum, and spring-controlled means normally holding said shoe in engagement with said anchor pin, said spring being adapted to be compressed to permit bodily movement of said shoe relative to said anchor pin for regulating the frictional pressure between said shoe and drum.

3. In a brake mechanism, a rotatable drum, a brake shoe engageable therewith having an enlarged opening in one end thereof, an anchor pin extending through said opening, means for pivoting said shoe about said pin into frictional engagement with said drum, a compression spring engaging said shoe adjacent to said opening, and a housing for said spring, said spring normally holding said shoe in engagement with said anchor pin whereby said spring permits bodily movement of said shoe relative to said anchor pin when the frictional pressure between said shoe and drum exceeds the compression pressure of said spring.

4. In a vehicle brake, a rotatable drum, a backing plate adjacent to the open side thereof, a brake shoe engageable therewith having an enlarged opening in one end thereof, an anchor pin secured to said backing plate extending through said opening, means for pivoting said shoe about said anchor pin to frictionally engage said drum, a coil spring engaging said shoe adjacent to said opening, and a housing for said spring mounted on said backing plate, said spring being compressed when the frictional pressure between said shoe and drum exceeds the compression pressure thereof for permitting bodily movement of said shoe relative to said anchor pin.

5. In a vehicle brake of the servo type, a rotatable drum, a primary and secondary brake shoe pivotally interconnected, said secondary shoe being provided with an enlarged opening at one end, an anchor pin extending through said opening, means for moving said primary shoe into engagement with said drum, and spring-controlled means engaging said secondary shoe adjacent to said anchor pin adapted to permit bodily movement of said shoe relative to said anchor pin.

6. In a vehicle brake, a rotatable drum, a backing plate adjacent to the open side thereof, a brake element engageable with said drum, means for moving said element into frictional engagement with said drum, anchoring means for said element mounted on said backing plate, an enlarged aperture in said brake element through which said anchoring means extends, and spring-controlled means permitting movement of said element relative to said anchoring means for regulating the frictional pressure between said element and said drum to prevent locking of said drum against rotation during the normal operation of applying said brake.

7. In a vehicle brake, a rotatable drum, a backing plate adjacent to the open side thereof, a three-part servo brake element engageable with said drum, an anchor for the intermediate part of said brake element mounted on said backing plate, means for moving said element into frictional engagement with said drum, and spring-controlled means supported by said backing plate having engagement with the intermediate part of said brake element to allow movement of the same relative to said anchor for limiting the amount of frictional pressure between said element and drum.

8. A brake anchor having a socket on one side, and a spring seated in the socket and adapted to be engaged by a shoe.

KARL L. HERRMANN.